United States Patent
Sakuma et al.

(10) Patent No.: US 9,190,196 B2
(45) Date of Patent: Nov. 17, 2015

(54) RARE EARTH MAGNET AND MANUFACTURING METHOD THEREFOR

(75) Inventors: Noritsugu Sakuma, Susono (JP); Tetsuya Shoji, Susono (JP); Masao Yano, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 67 days.

(21) Appl. No.: 13/515,695

(22) PCT Filed: Dec. 16, 2010

(86) PCT No.: PCT/IB2010/003402
§ 371 (c)(1),
(2), (4) Date: Jun. 13, 2012

(87) PCT Pub. No.: WO2011/073797
PCT Pub. Date: Jun. 23, 2011

(65) Prior Publication Data
US 2012/0247624 A1 Oct. 4, 2012

(30) Foreign Application Priority Data
Dec. 18, 2009 (JP) ................................. 2009-287911

(51) Int. Cl.
*C22F 3/00* (2006.01)
*H01F 1/057* (2006.01)
(Continued)

(52) U.S. Cl.
CPC .............. *H01F 1/0571* (2013.01); *B82Y 25/00* (2013.01); *C22C 33/003* (2013.01);
(Continued)

(58) Field of Classification Search
CPC .. C22C 33/003; C22C 38/002; C22C 38/005; C22C 45/02

USPC .......................... 148/100–103, 302, 304–305
See application file for complete search history.

(56) References Cited

U.S. PATENT DOCUMENTS
2002/0003007 A1  1/2002  Hirota et al.

FOREIGN PATENT DOCUMENTS

| JP | 64-7504 A | 1/1989 |
| JP | 2007-251037 A | 9/2007 |
| JP | 2008-069444 A | 3/2008 |

OTHER PUBLICATIONS

Panagiotopoulos et al., Magnetic Properties and Microstructure of Melt-Spun Nd-Fe-Ga-B Alloys, IEEE Transactions on Magnetics, vol. 31, No. 6, Nov. 1995, pp. 3617-3619.*

(Continued)

*Primary Examiner* — Jie Yang
(74) *Attorney, Agent, or Firm* — Sughrue Mion, PLLC

(57) ABSTRACT

A rare earth magnet of the invention has a composition represented by the compositional formula $R_a H_b Fe_c Co_d B_e M_f$, where:
R is at least one rare earth element including Y;
H is at least one heavy rare earth element from among Dy and Tb;
M is at least one element from among Ga, Zn, Si, Al, Nb, Zr, Ni, Cu, Cr, Hf, Mo, P, C, Mg, and V;
$13 \leq a \leq 20$;
$0 \leq b \leq 4$;
$c = 100-a-b-d-e-f$;
$0 \leq d \leq 30$;
$4 \leq e \leq 20$;
$0 \leq f \leq 3$, and has a structure constituted by a main phase: a $(RH)_2(FeCo)_{14}B$ phase, and a grain boundary phase: a $(RH)(FeCo)_4B_4$ phase and a RH phase, with a crystal grain size of the main phase of 10 nm to 200 nm.

8 Claims, 11 Drawing Sheets

(51) Int. Cl.
*B82Y 25/00* (2011.01)
*C22C 33/00* (2006.01)
*C22C 38/00* (2006.01)
*C22C 45/02* (2006.01)

(52) U.S. Cl.
CPC ............ *C22C 38/002* (2013.01); *C22C 38/005* (2013.01); *C22C 45/02* (2013.01); *C22F 3/00* (2013.01); *H01F 1/0579* (2013.01)

(56) References Cited

OTHER PUBLICATIONS

Ozawa et al., Effects of Cooling Rate on Microstructures and Magnetic Properties of Nd-Fe-B alloys, Journal of Alloys and Compounds, 363, 2004, pp. 263-270.*

NPL-2: Shinba et al, Transmission electron microscopy study on Nd-rich phase and grain boundary structure of Nd-Fe-B sintered magnets, Journal of Applied Physics, vol. 97, 053504, pp. 1-8, 2005.*

Pollard R J et al: "Effect of Zr additions on the microstructural and magnetic properties of NDFeB based magnets", IEEE Transactions on Magnetics USA, vol. 24, No. 2, Mar. 1998, pp. 1626-1628, XP002630455, ISSN: 0018-99464.

Yin X J et al: "The microstructural characterisation of Nd-Fe-B alloys. II: Microstructural investigation of cast Nd-Fe-B materials", Journal of Magnestism and Magnetic Materials, Elsevier Science Publishers, Amsterdam, NL, vol. 125, No. 1-2, Jul. 1, 1993, pp. 91-102, XP024475312, ISSN: 0304-8853, DOI: DOI:10.1016/0304-8853(93)90822-J.

Crew D C et al: "Magnetic interactions and reversal behavior of Nd2Fe14B particles diluted in a Nd matrix", Physical Review B66, 184418 (2002).

International Search Report and Written Opinion for corresponding International Patent Application No. PCT/IB2010/003402 mailed Apr. 7, 2011.

Japanese Office Action for corresponding JP Patent Application No. 2009-287911 issued on Nov. 8, 2011.

* cited by examiner

F I G . 7
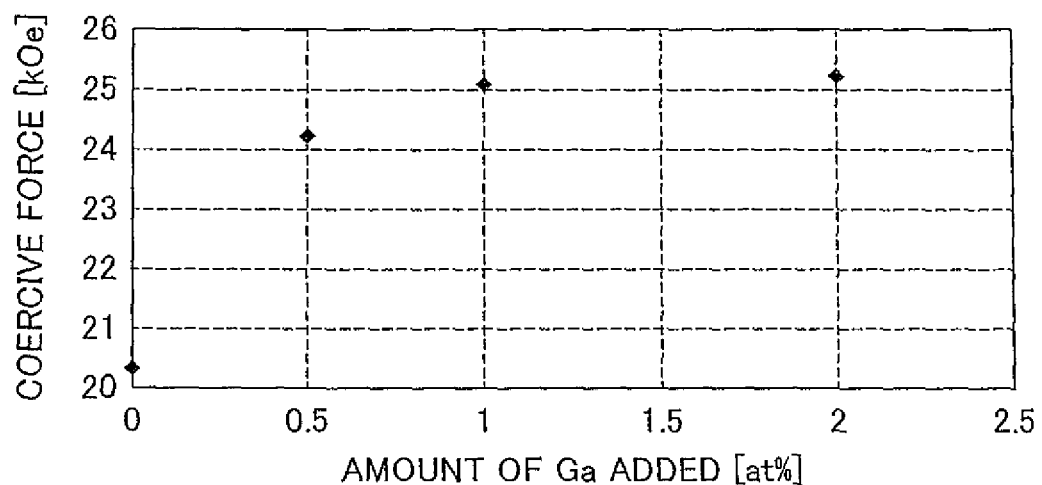
F I G . 8
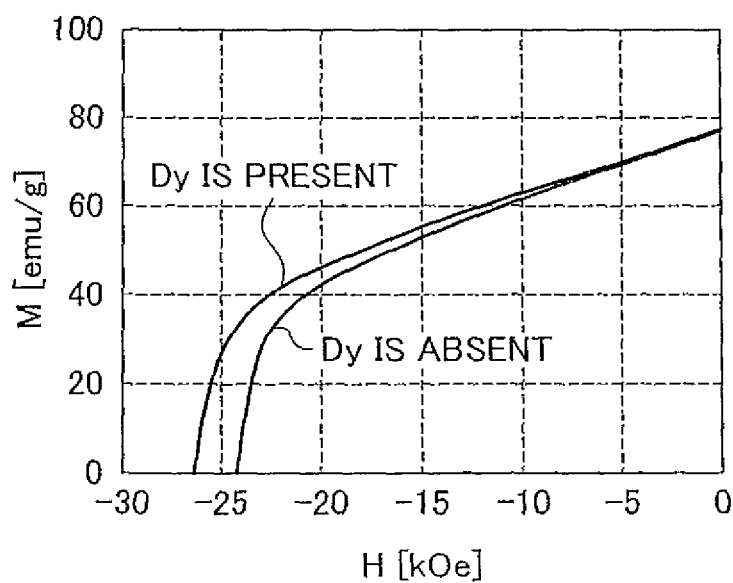

RARE EARTH MAGNET AND MANUFACTURING METHOD THEREFOR

BACKGROUND OF THE INVENTION

1. Field of the Invention

The invention relates to a rare earth magnet constituted by a polycrystal having nanosize crystal grain size and to a manufacturing method therefor.

2. Description of the Related Art

Rare earth magnets such as a neodymium magnet ($Nd_2Fe_{14}B$) have been used for various applications as very powerful permanent magnets with a high magnetic flux density. A nanosize crystal grain size should be ensured to obtain even better magnetic properties.

A technique by which a melt of a magnet composition is rapidly cooled by a single roll method or a twin roll method to obtain a thin strip has been used to realize a nanosize crystal grain size. Where the cooling rate during rapid cooling is too high, an amorphous structure is obtained in the entire magnet or part thereof. The amorphous structure can be crystallized by appropriate annealing, but the grain size in this case becomes larger than that of the crystal structure directly formed by rapid cooling.

In sintered magnets using multi-domain $Nd_2Fe_{14}B$ particles with a size of about several micron, a grain boundary phase should be present as a barrier preventing the movement or appearance of magnetic walls in order to realize a high coercive force.

For example, Japanese Patent Application Publication No. 2007-251037 (JP-A-2007-251037) and Japanese Patent Application Publication No. 2008-069444 (JP-A-2008-069444) disclose a method including the steps of feeding an alloy melt containing praseodymium (Pr), neodymium (Nd), iron (Fe), cobalt (Co), niobium (Nb), yttrium (Y), and boron (B) to a rotating cooling roll, rapidly cooling, obtaining a thin strip, and crystallizing the thin strip by heat treating at a temperature rise rate of 150 to 250° C./min. As a result, a thin alloy strip for a rare earth magnet constituted by a polycrystal and including the aforementioned constituent element can be obtained.

However, no consideration is given to a graph boundary phase and there is room for increasing a coercive force.

A coercive force of the aforementioned magnet at room temperature has been evaluated, but for a motor of a hybrid vehicle the evaluation should be conducted for a coercive force at a temperature close to 160° C. which is in the usage temperature range of the motor.

SUMMARY OF INVENTION

The invention provides a rare earth magnet in which the refinement of crystal grains to a nanometer size is enhanced and a coercive force is increased due to the presence of a grain boundary phase and also provides a method for manufacturing such a magnet.

The first aspect of the invention relates to a rare earth magnet having a composition represented by the compositional formula $R_aH_bFe_cCo_dB_eM_f$, where:

R is at least one rare earth element including Y;
H is at least one heavy rare earth element from among Dy and Tb;
M is at least one element from among Ga, Zn, Si, Al, Nb, Zr, Ni, Cu, Cr, Hf, Mo, P, C, Mg, and V;
$13 \le a \le 20$;
$0 \le b \le 4$;
$c=100-a-b-d-e-f$;
$0 \le d \le 30$;
$4 \le e \le 20$;
$0 \le f \le 3$, and having a structure constituted by a main phase: a $(RH)_2(FeCo)_{14}B$ phase, and a grain boundary phase: a $(RH)(FeCo)_4B_4$ phase and a RH phase, with a crystal grain size of the main phase of 10 nm to 200 nm.

The second aspect of the invention relates to a method for manufacturing a rare earth magnet, including:

rapidly cooling and solidifying an alloy melt having a composition represented by the compositional formula $R_aH_bFe_cCo_dB_eM_f$, where:
R is at least one rare earth element including Y;
H is at least one heavy rare earth element from among Dy and Tb;
M is at least one element from among Ga, Zn, Si, Al, Nb, Zr, Ni, Cu, Cr, Hf, Mo, P, C, Mg, and V;
$13 \le a \le 20$;
$0 \le b \le 4$;
$c=100-a-b-d-e-f$;
$0 \le d \le 30$;
$4 \le e \le 20$;
$0 \le f \le 3$, thereby creating a structure constituted by a main phase: a $(RH)_2(FeCo)_{14}B$ phase, and a grain boundary phase: a $(RH)(FeCo)_4B_4$ phase and a RH phase, with a crystal grain size of the main phase of 10 nm to 200 nm.

The rare earth magnet in accordance with the invention is constituted by a main phase: a $(RH)_2(FeCo)_{14}B$ phase, and a grain boundary phase: a $(RH)(FeCo)_4B_4$ phase and a RH phase, and has a crystal grain size of the main phase of 10 nm to 200 nm. As a result, a high coercive force can be obtained.

With the method for manufacturing a rare earth magnet in accordance with the invention, a rare earth magnet with a high coercive force can be manufactured by performing rapid cooling and solidification at a cooling rate at which the above-described crystal structure is generated.

When an amorphous phase is produced during rapid cooling and solidification, this phase can be crystallized by annealing.

When, b, d, and f are zero in the above-described rare earth magnet and manufacturing method therefor, it means that the respective elements are not contained in the compositional formula. For example, when b=d=f=0, the compositional formula is $R_aFe_cB_e$.

BRIEF DESCRIPTION OF DRAWINGS

The foregoing and further objects, features and advantages of the invention will become apparent from the following description of exemplary embodiments with reference to the accompanying drawings, wherein like numerals are used to represent like elements and wherein:

FIG. 7 is a graph illustrating the relationship between a coercive force and an amount of Ga added to the rapidly cooled ribbon fabricated in Example 2;

FIG. 8 is a graph illustrating the effect produced by addition of Dy on magnetic properties of the rapidly cooled ribbon fabricated in Example 2;

DETAILED DESCRIPTION OF EMBODIMENTS

Figure 1:
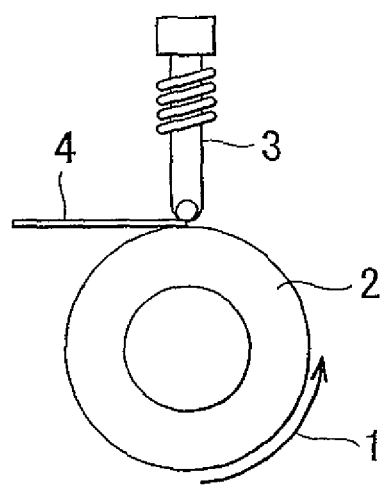
FIG. 1 is a schematic diagram illustrating a single roll used in the fabrication of a rapidly cooled ribbon of a nano-polycrystalline rare earth magnet in accordance with the invention.

The nanosize crystal grain size in the embodiments of the invention is preferably equal to or less than a single domain particle diameter, that is 10 to 200 nm, more preferably 10 to 50 nm.

A representative rare earth magnet of an embodiment of the invention is represented by the compositional formula $Nd_aFe_cB_e$ with $13 \leq a \leq 20$; $4 \leq c \leq 20$; $e=100-a-c$, and has a structure constituted by a main phase: a $Nd_2Fe_{14}B$ phase, and a grain boundary phase: a $NdFe_4B_4$ phase and a Nd phase.

A phase ratio (volume ratio) of the $NdFe_4B_4$ phase and the Nd phase constituting the graph boundary phase is preferably ($NdFe_4B_4$ phase):(Nd phase)=20:80 to 80:20.

In the rare earth magnets of the embodiments of the invention, in the case of a pure three-component NdFeB system containing no additional element M, a coercive force at normal temperature in a state immediately after rapid cooling and solidification is equal to or higher than 15 kOe and in the case of a system including an additional element M, a coercive force of equal to or higher than 20 kOe can be obtained.

A reduction ratio of the coercive force with temperature in the rare earth magnets of the embodiments of the invention is equal to or less than 0.42%/° C., preferably equal to or less than 0.40%/° C.

A ratio (volume) of a crystalline phase in the structure is preferably equal to or higher than 95%.

In the method for manufacturing the rare earth magnet of the embodiment of the invention, the production of an amorphous structure is inhibited and a nanosize crystalline structure is readily produced by conducting rapid cooling at a cooling rate equal to or higher than $5 \times 10^5$ K/s, preferably equal to or lower than $2 \times 10^6$ K/s. When the cooling rate during rapid cooling is too high (for example, higher than $2 \times 10^6$ K/s), an amorphous phase is generated. A single roll method and a twin roll method can be used for rapid cooling, but these methods are not limiting. In the below-described Examples 1 to 4 and 6, rare earth magnet ribbons were manufactured by conducting rapid cooling and solidification at a cooling rate of $5 \times 10^5$ K/s to $2 \times 10^6$ K/s.

When an amorphous phase has appeared during rapid cooling and solidification, this phase may be crystallized by annealing.

In the manufacturing method in accordance with the invention, the process from a molten state of the alloy to completion of solidification is preferably performed in a nonoxidizing atmosphere.

EXAMPLE 1

Ingots of NdFeBGa alloys with compositions a to e shown in table 1 were produced by arc melting. The compositions a to e were selected on a NdFeB ternary equilibrium state diagram such as to obtain a volume fraction of a grain boundary phase ($NdFe_4B_4$ phase+Nd phase) of 18% (constant). Table 1 also shows the $NdFe_4B_4$ phase:Nd phase ratio in the grain boundary phase. This ratio was determined by calculations on the NdFeB ternary equilibrium state diagram.

TABLE 1

| | $NdFe_4B_4$ | Nd |
|---|---|---|
| a. $Nd_{20}Fe_{73.5}B_{5.5}Ga$ | 15% | 85% |
| b. $Nd_{17.5}Fe_{74}B_{7.5}Ga$ | 39% | 61% |
| c. $Nd_{16}Fe_{74}B_9Ga$ | 56% | 44% |
| d. $Nd_{14}Fe_{74.5}B_{10.5}Ga$ | 76% | 24% |
| e. $Nd_{13}Fe_{74.5}B_{11.5}Ga$ | 87% | 13% |

Ribbons were fabricated from the ingots by using the single roll furnace shown in FIG. 1 and conducting rapid cooling and solidification under the conditions shown in Table 2. A ribbon 4 (referred to hereinbelow as "rapidly cooled ribbon") is obtained by ejecting the alloy melt from a nozzle 3 on the outer peripheral surface of a single roll 2 rotating in the direction shown by arrow 1, thereby causing rapid cooling and solidification.

TABLE 2

| Nozzle diameter | 0.6 mm |
|---|---|
| Clearance | 0.7 mm |
| Ejection pressure | 0.4 kg/cm³ |
| Roll speed | 2350 rpm |
| Melting temperature | 1450° C. |

Magnetic properties of the obtained rapidly cooled ribbon were measured with a Vibrating Sample Magnetometer (VSM) (manufactured by Lake Shore Co., model 7410). A crystal structure of the ribbon was analyzed with a XRD (manufactured by Rigaku Co., RINT-2000).

Figure 2:
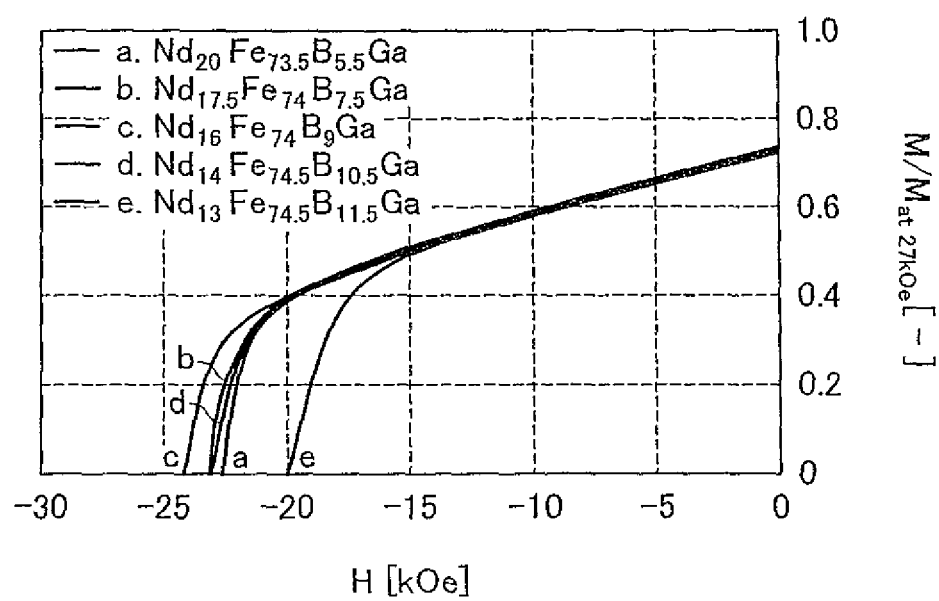
FIG. 2 is a graph illustrating results obtained in measuring magnetic properties of the rapidly cooled ribbon fabricated in Example 1.
Figure 3:
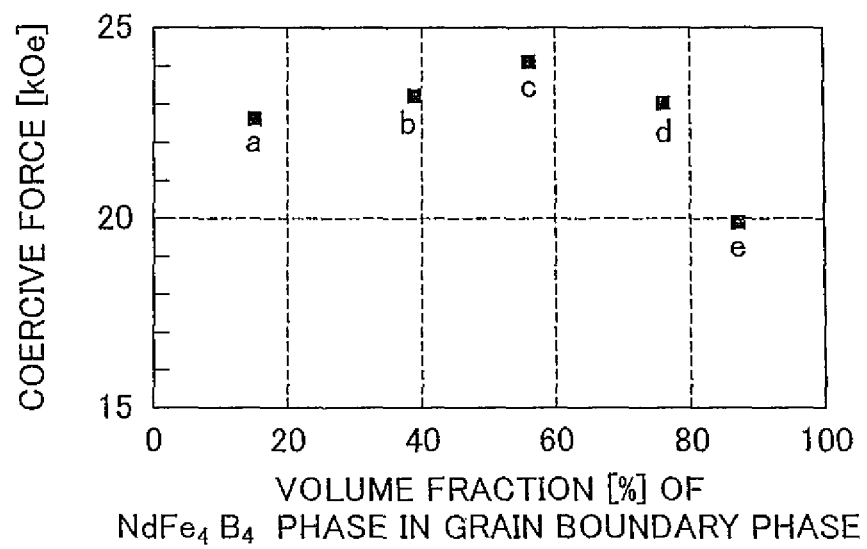
FIG. 3 is a graph illustrating the relationship between a coercive force and a $NdFe_4B_4$ phase ratio in the grain boundary phase of the rapidly cooled ribbon fabricated in Example 1.

FIG. 2 shows the results obtained in measuring magnetic properties. A coercive force increased with the increase in the $NdFe_4B_4$ phase ratio in the grain boundary phase in the order of a→c, assumed a maximum value in the c composition of $Nd_{16}Fe_{74}B_9Ga_1$ and then decreased in the order of c→e with the increase in the $NdFe_4B_4$ phase ratio. Since the $Mr/Mr_{at27kOe}$ value is constant, there is no difference in exchange coupling ability between the crystal grains, and the difference in grain size of the main phase $Nd_2Fe_{14}B$ apparently became the difference in coercive force. In FIG. 3, a coercive force is plotted against a $NdFe_4B_4$ phase ratio in the grain boundary phase.

It is considered that the main phase grain size varied depending on the phase ratio in the grain boundary phase apparently because the main phase coarsening was inhibited as the ratio (volume ratio) of the $NdFe_4B_4$ phase that was in a peritectic relationship with the main phase increased from that of the composition a to that of the composition c and the coercive force increased due to crystal grain refinement. However, where the ratio (volume ratio) of the $NdFe_4B_4$ phase increased in excess of that of the composition c, the nucleation frequency of the main phase decreased, crystal grains of the main phase were coarsened, and the coercive force decreased.

Figure 4:
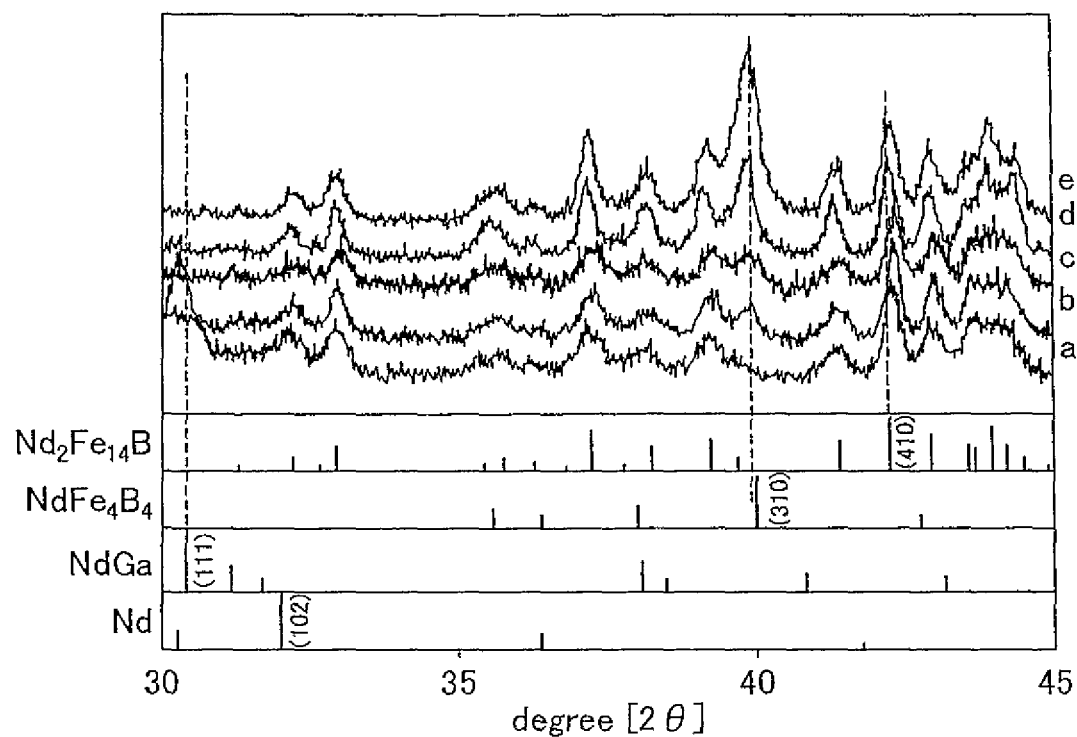
FIG. 4 is a graph illustrating a X-Ray Diffraction (XRD) chart of the rapidly cooled ribbon fabricated in Example 1.

FIG. 4 is diffraction chart of XRD. In the composition a, the diffraction intensity of NdGa is high and a clear peak is observed. Therefore, it is obvious that Ga used as the additional element M formed a compound with Nd contained in the grain boundary phase.

In the composition b and compositions with a lower content ratio of neodymium, a NdGa peak was eliminated and a peak intensity of the $NdFe_4B_4$ phase increased. In the composition b and compositions with a lower content ratio of neodymium, the $NdFe_4B_4$ phase contained in the grain boundary phase was a crystalline phase, but the Nd phase (NdGa phase) apparently became amorphous. In the composition a, a volume fraction of the Nd phase in the finally solidified portion was high, the Nd phase that has locally aggregated was slowly cooled and crystallized, whereas in the composition b and compositions with a lower content ratio of neodymium, the volume fraction of the Nd phase was low and the uniformly dispersed Nd phase was rapidly cooled and amorphousized.

In the composition e, the peak intensity of the $NdFe_4B_4$ phase increased abruptly. Therefore, the reaction path was different from that of the compositions a to d and it is possible than the initial crystals were not of the $Nd_2Fe_{14}B$ phase. This is apparently why the coarsening of the $Nd_2Fe_{14}B$ phase could not be prevented by the peritectic reaction of the $NdFe_4B_4$ phase and the coercive force decreased.

As a result, the highest coercive force was obtained in the composition c in which the Nd phase was uniformly dispersed and the peritectic reaction of the $NdFe_4B_4$ phase could be used.

<Effect of Volume Fraction of Grain Boundary Phase>

The above-described results were obtained in the case in which the volume fraction of grain boundary phase was 18% (constant). Rapidly cooled ribbons were also fabricated in the same manner as described above and magnetic properties thereof were measured with the VSM in the cases in which the volume fraction of grain boundary phase was 28% (constant) and 12% (constant).

Figure 5:
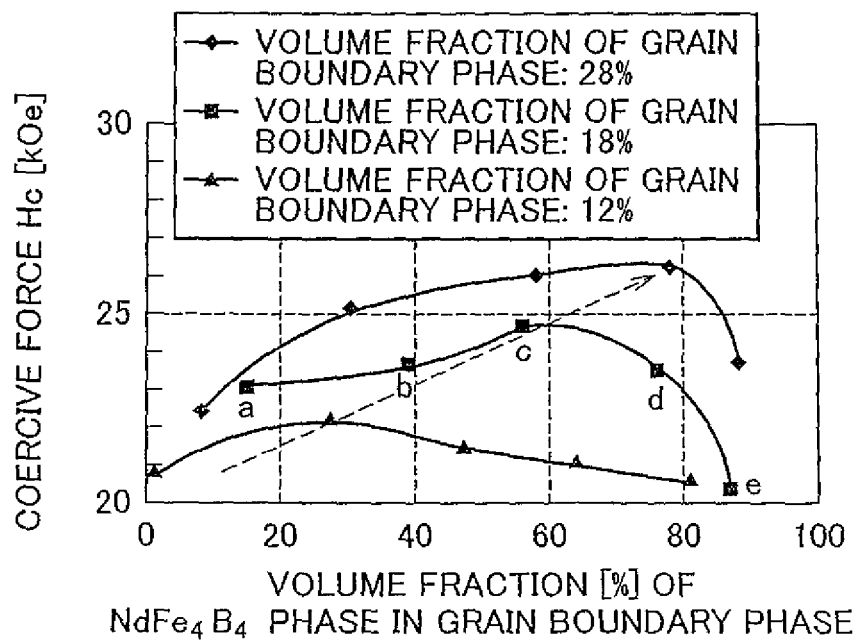
FIG. 5 is a graph illustrating the relationship between a coercive force and a $NdFe_4B_4$ phase ratio in the grain boundary phase of the rapidly cooled ribbons with various volume ratio of grain boundary phase that were fabricated in Example 1.

In FIG. 5, a coercive force is plotted against the $NdFe_4B_4$ phase ratio in the grain boundary phase for volume fractions of 12%, 18%, and 28%.

As shown in FIG. 5, the maximum value of coercive force and the phase ratio of the $NdFe_4B_4$ phase at which the coercive force becomes maximum increase with the increase in the volume fraction of the grain boundary phase. Thus, a peak position of a curve representing a coercive force with respect to a phase ratio of the $NdFe_4B_4$ phase shifts up and to the right as shown by a broken line in the figure. From this standpoint, the preferred phase ratios of the $NdFe_4B_4$ phase can be generally classified in the following manner.

When the volume fraction of the grain boundary phase is <15%, the phase ratio of the $NdFe_4B_4$ phase is <50%.

When the volume fraction of the grain boundary phase is 15% to 23%, the phase ratio of the $NdFe_4B_4$ phase is 15 to 80%.

When the volume fraction of the grain boundary phase is >23%, the phase ratio of the $NdFe_4B_4$ phase is 30 to 80%.

EXAMPLE 2

Effect of Additional Element

Arc ingots were prepared of compositions obtained by adding 2 at. % of Ga, Cr, Si, V, or Ni as an element other than a heavy rare earth element, to $Nf_{16}Fe_{47}B_{10}$ according to the example 2 of the invention. A rapidly cooled ribbon was fabricated from each ingot under the conditions shown in Table 3 by using a single roll furnace shown in FIG. 1.

TABLE 3

| | |
|---|---|
| Nozzle diameter | 0.6 mm |
| Clearance | 0.7 mm |
| Ejection pressure | 0.4 kg/cm$^3$ |
| Roll speed | 2350 rpm |
| Melting temperature | 1450° C. |

Magnetic properties of the obtained rapidly cooled ribbon were measured with the VSM.

Figure 6:
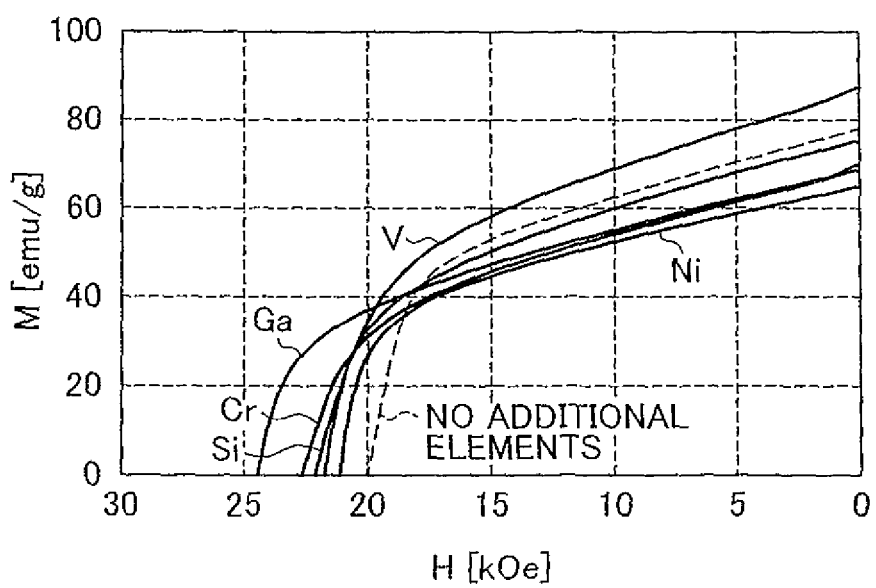
FIG. 6 is a graph illustrating results obtained in measuring magnetic properties of the rapidly cooled ribbon fabricated in Example 2.

FIG. 6 shows the results obtained in measuring magnetic properties. The addition of the elements increased the coercive force by comparison with that of the composition $Nd_{16}Fe_{47}B_{10}$ containing no additional elements. This is apparently because the additional elements produce a compound or a solid solution with the grain boundary phase, thereby inhibiting the growth of crystal grains of the main phase.

<Effect of the Amount Added>

FIG. 7 shows a coercive force obtained when Ga was added within a range of up to 2 at. % to $Nd_{16}Fe_{47}B_{10}$. The coercive force increased with the increase in the amount of Ga added. However, no significant changes in the coercive force were observed after the amount added was higher than 1 at. %. Since magnetization decreases with the increase in the amount added, the amount of 2-3 at. % can be considered as an upper limit.

<Effect of Addition of Heavy Rare Earth Element>

FIG. 8 shows magnetization curves obtained when Dy was added at a ratio of 0.5 at. % to $Nd_{16}Fe_{47}B_{10}$ and when no addition was made. The coercive force could be increased without decreasing the magnetization with respect to the composition $Nd_{16}Fe_{47}B_{10}$ by adding merely 0.5 at. % of Dy. When Dy was added at 2 at. %, the coercive force exceeded 30 kOe and thus exceeded the measurement limit of the VSM. As a result, the measurements could not be conducted.

EXAMPLE 3

Effect of Crystal Grain Size

Rapidly cooled ribbons of compositions (1) to (5) shown in Table 5 were fabricated in the same manner as in Example 1 under the conditions shown in Table 4 by using a single roll.

TABLE 4

| | |
|---|---|
| Nozzle diameter | 0.6 mm |
| Clearance | 0.7 mm |
| Ejection pressure | 0.4 kg/cm³ |
| Roll speed | 2350 rpm |
| Melting temperature | 1450° C. |

TABLE 5

| | Composition | Coercive force (kOe) | Grain size (nm)/number calculation | Grain size (nm)/volume calculation |
|---|---|---|---|---|
| (1) | $Nd_{14}Fe_{76}B_8GaCu$ | 20.5 | 65 | 93 |
| (2) | $Nd_{14}Fe_{75}B_{10}Ga$ | 22.8 | 60.5 | 87 |
| (3) | $Nd_{15}Fe_{70}B_{14}Ga$ | 23.9 | 51 | 64.5 |
| (4) | $Nd_{15}Fe_{65}B_{19}Ga$ | 26.7 | 32 | 44 |
| (5) | $Nd_{15}Fe_{65}B_{19}Ga$ | 28.1 | 24.5 | 40 |

Magnetic properties of the obtained rapidly cooled ribbon were measured with the VSM.

Fracture surfaces of the rapidly cooled ribbons were observed with a SEM and a crystal grain size was calculated.

Figure 9:
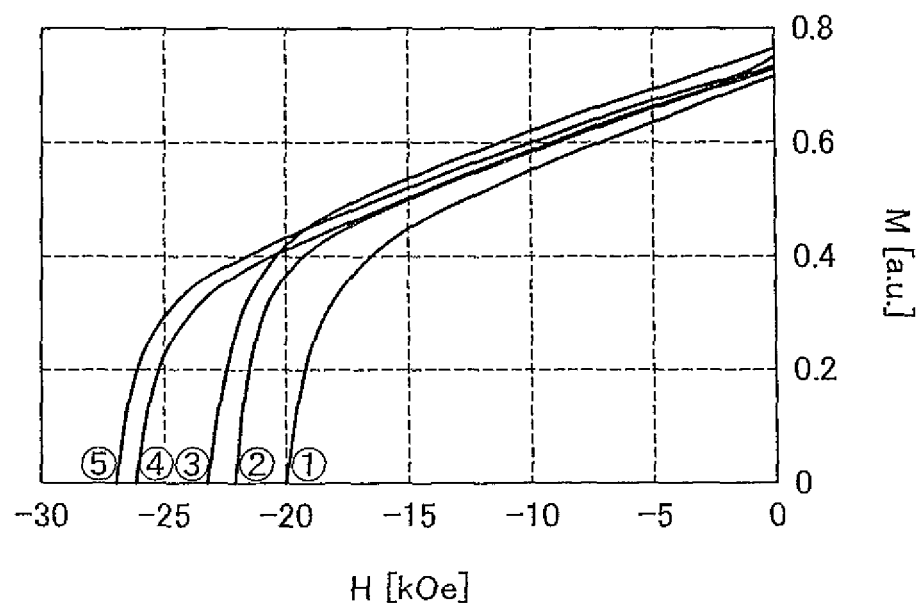
FIG. 9 is a graph illustrating results obtained in measuring magnetic properties of the rapidly cooled ribbon fabricated in Example 3.
Figure 10A:
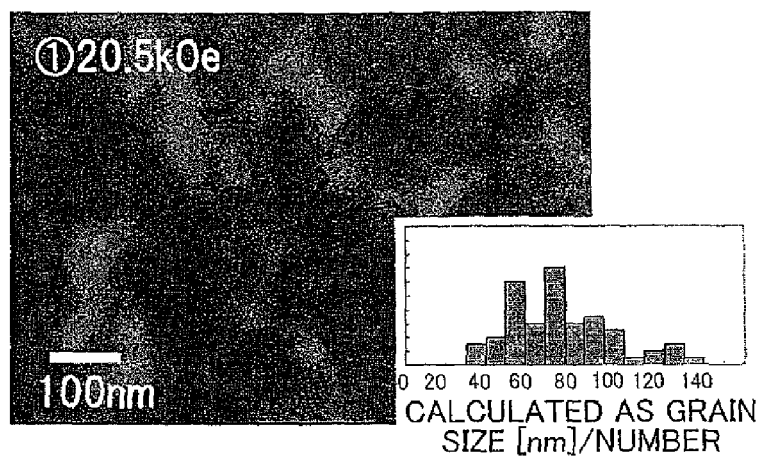
FIGS. 10A to 10C are photos illustrating Scanning Electron Microscope (SEM) images of fracture surfaces of the rapidly cooled ribbon fabricated in Example 3.
Figure 10B:
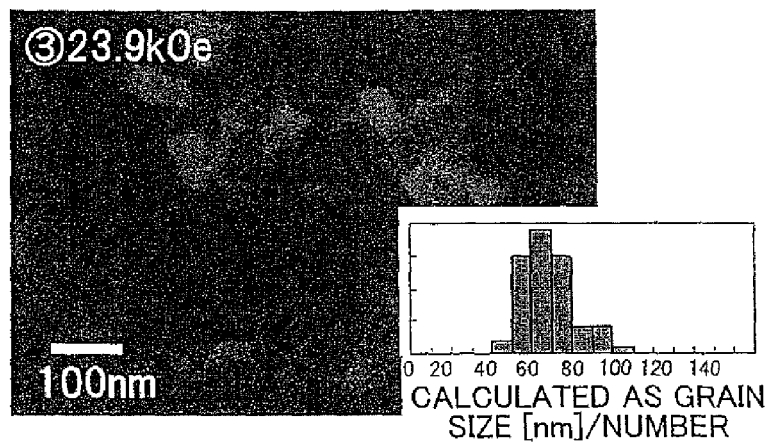
Figure 10C:
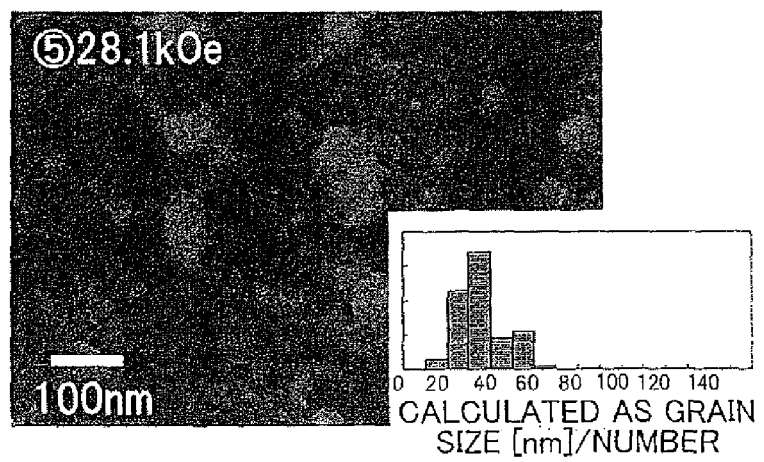

FIG. 9 shows magnetic properties, and FIGS. 10A to 10C show SEM images.

The coercive force obtained increased with the decrease in the crystal grain diameter. Since the ribbon used had compositions obtained by adding Ga or GaCu to the NdFeB base composition, crystal period anisotropy of the main phase $Nd_2Fe_{14}B$ did not vary among the ribbons. Therefore, the increase in the coercive force can be attributed to crystal grain refinement of the main phase.

In a region of a single domain (SD) crystal grain size, the volume-recalculated grain size was found to lay on a line with a constant inclination. In a rapidly cooled ribbon of composition (1) that had a coercive force of 20.5 kOe, because the grain size distribution was large (FIG. 10A), the effect of coarse crystal grains with a small coercive force increased and the calculated coercive force could be below the coercive force predicted on the basis of the average grain size. Experimental results suggest that when an anisotropic magnetic field of $Nd_2Fe_{14}B$ is 67 kOe, a crystal grain size of about 10 nm is necessary to realize 33.5 kOe (67 kOe×½), which is a theoretical value for an isotropic system.

Figure 11:
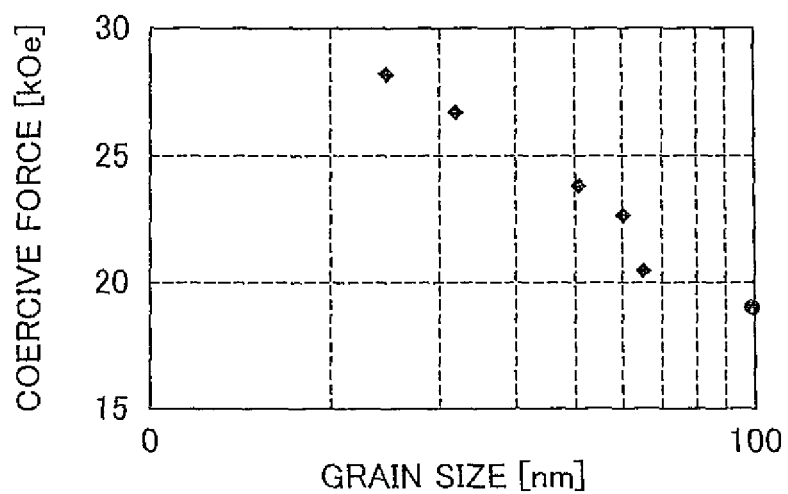
FIG. 11 is a graph illustrating the relationship between a crystal grain diameter and a coercive force of the rapidly cooled ribbon fabricated in Example 3.

FIG. 11 shows a relationship between a crystal grain size and a coercive force for compositions (1) to (5). In this case, a black rhombic mark shows a grain size and coercive force after the rapidly cooled ribbon of composition (3) has been annealed (575° C.×1 min). The coercive force decreased as the crystal grains coarsened and the result laid almost on the extension of a line connecting points of five other plots. It is clear that within this range of composition variations, there is a strong correlation between the coercive force and the crystal grain size.

EXAMPLE 4

Fabrication of Rapidly Cooled Ribbon of Pure Ternary NdFeB

Rapidly cooled ribbons a to d of pure ternary NdFeB obtained by changing x in a succession of 11.8, 14, 15, and 17 (at. %) in $Nd_xFe_{100-3x/2}B_{x/2}$ were fabricated under the conditions shown in Table 6 by using a single roll, and magnetic properties were measured by using the VSM. The phase ratio $Nd:NdFe_4B_4$ of the grain boundary phase was fixed at 59:41.

TABLE 6

| | |
|---|---|
| Nozzle diameter | 0.6 mm |
| Clearance | 0.7 mm |
| Ejection pressure | 0.4 kg/cm³ |
| Roll speed | 2350 rpm |
| Melting temperature | 1450° C. |

Rapidly cooled ribbons were also fabricated by using a Nd-rich composition e ($Nd_{15}Fe_{70}B_{15}$, phase ratio $Nd:NdFe_4B_4$ of the grain boundary phase was 22:78) and a B-rich composition f ($Nd_{20}Fe_{65}B_{15}$, phase ratio $Nd:NdFe_4B_4$ of the grain boundary phase was 41:59), and magnetic properties of the ribbons were measured.

Figure 12:
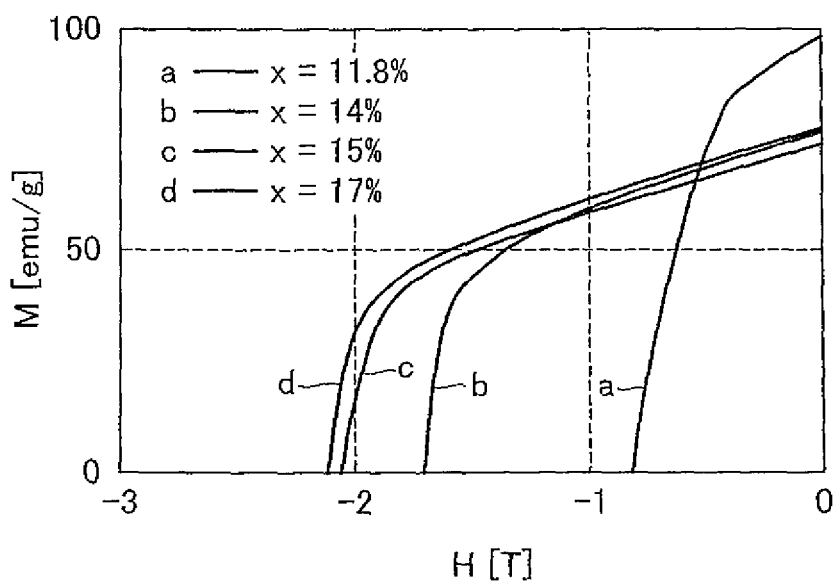
FIG. 12 is a graph illustrating results obtained in measuring magnetic properties of the rapidly cooled ribbon fabricated in Example 4.
Figure 13:
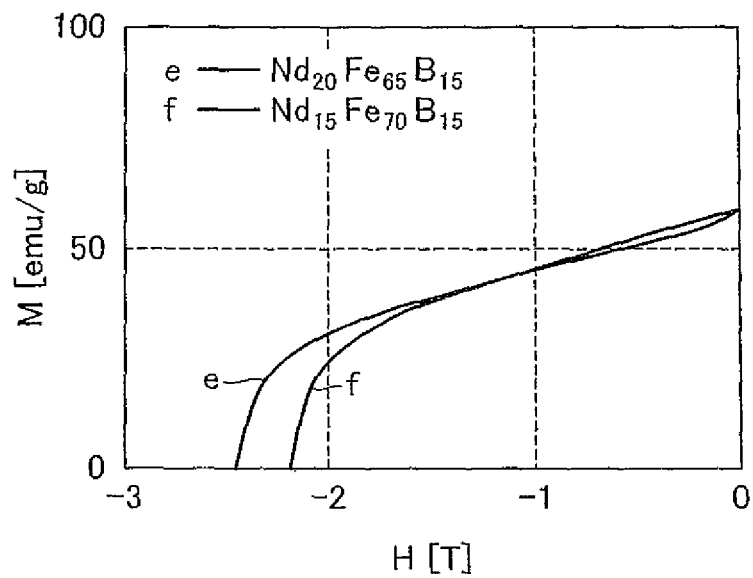
FIG. 13 is a graph illustrating results obtained in measuring magnetic properties of another rapidly cooled ribbon fabricated in Example 4.

FIGS. 12 and 13 show the results obtained in measuring magnetic properties.

As shown in FIG. 12, when the Nd amount was increased in compositions a to d, the coercive force reached saturation at 22 kOe. This is apparently because even when the Nd amount was increased, crystal grains of the $Nd_2Fe_{14}B$ phase of the main phase could not be refined when the amount of neodymium was equal to or higher than a predetermined value.

As shown in FIG. 13, in the Nd-rich and B-rich compositions e and f, the volume fraction of the grain boundary phase $NdFe_4B_4$ increased and magnetization decreased, but the coercive force increased and a coercive force with a maximum of 24.5 kOe was realized in the $Nd_{20}Fe_{65}B_{15}$ composition. Therefore, it was shown that by optimizing the composition, it was possible to refine crystal grains and fabricate rapidly cooled ribbons with high magnetization and high coercive force that are nano-polycrystalline magnets.

EXAMPLE 5

A rapidly cooled ribbon of a $Nd_{20}Fe_{65}B_{15}$ composition was fabricated by using a single roll under the conditions shown in Table 7. When the cooling rate during rapid cooling and solidification was equal to or higher than $2 \times 10^6$ K/s, a rapidly cooled ribbon that was mostly amorphous was fabricated. The obtained amorphous phase was crystallized by annealing, thereby making it possible to obtain a coercive force close to that of the rapidly solidified ribbon produced at a cooling rate of $5 \times 10^5$ K/s to $2 \times 10^6$ K/s.

TABLE 7

| | |
|---|---|
| Nozzle diameter | 0.6 mm |
| Clearance | 0.7 mm |
| Ejection pressure | 0.4 kg/cm³ |
| Roll speed | 3500 rpm |
| Melting temperature | 1450° C. |

In the present example, the rapidly solidified ribbon was crystallized by annealing with am infrared lamp (575° C.×1 min). Magnetic properties were then measured with the VSM.

Figure 14:
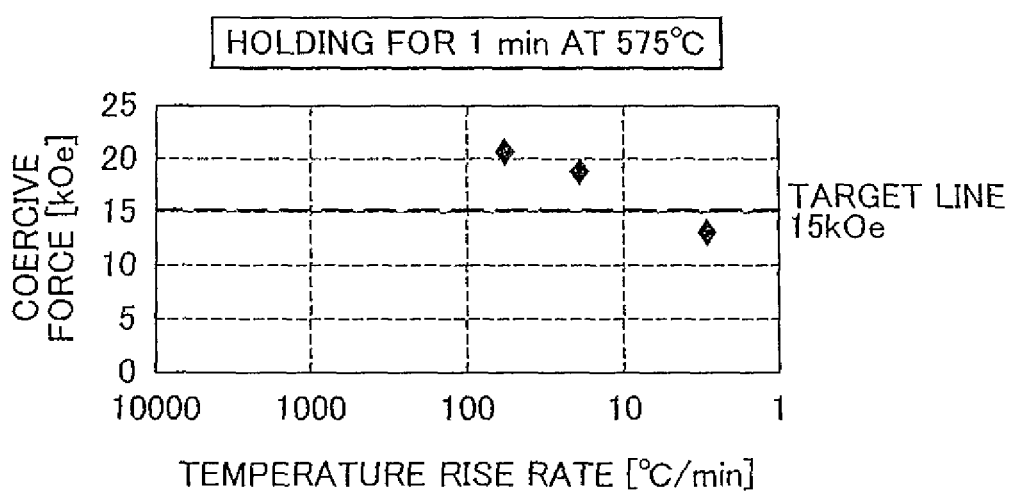
FIG. 14 is a graph illustrating the relationship between a temperature rise rate of the rapidly cooled ribbon fabricated in Example 5 during annealing and a coercive force of the rapidly cooled ribbon fabricated in Example 5.
Figure 15:
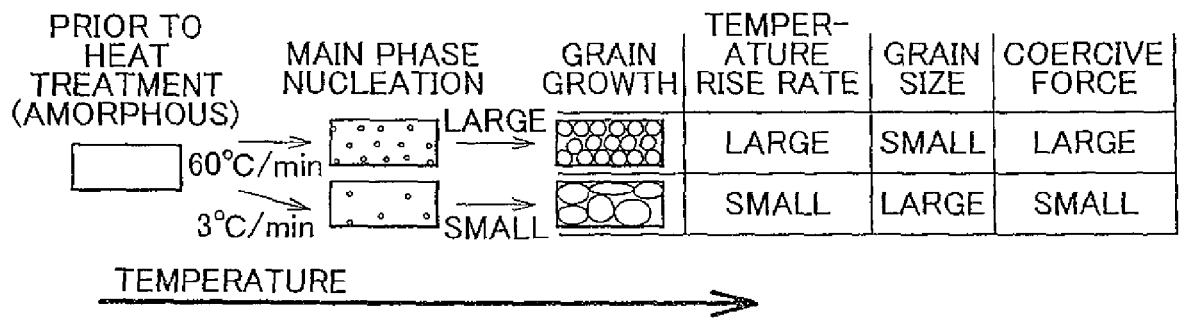
FIG. 15 is a schematic diagram illustrating structural changes during annealing in Example 5.

FIG. 14 shows the relationship between a temperature rise rate during annealing and a coercive force. The higher was the temperature rise rate, the higher was the coercive force. This is apparently because the final crystal grain size and coercive force are determined by the nucleation frequency and grain growth of the main phase, as shown by a schematic diagram in FIG. 15.

The general annealing conditions for crystallization were as follows: inactive atmosphere, temperature of 550 to 650° C., holding time 0.1 to 10 min, temperature rise rate equal to or higher than 20° C./min, preferably equal to or higher than 120° C./min.

EXAMPLE 6

Dependence of Coercive Force on Temperature

Rapidly cooled ribbons of compositions (1) $Nd_{15}Fe_{70}B_{15}$ and (2) $Nd_{15}Fe_{77}B_8$ in accordance with the example 6 of the invention were fabricated by using a single roll under the conditions shown in Table 8. Magnetic properties were measured at various temperature with the VSM.

TABLE 8

| Nozzle diameter | 0.6 mm |
|---|---|
| Clearance | 0.7 mm |
| Ejection pressure | 0.4 kg/cm³ |
| Roll speed | 2350 rpm |
| Melting temperature | 1450° C. |

Figure 16:
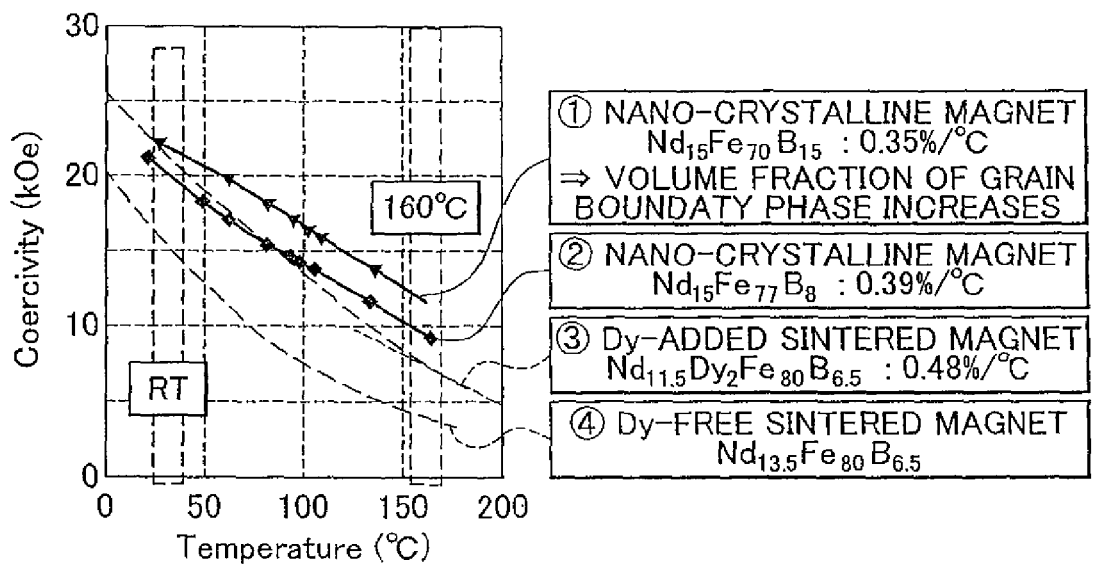
FIG. 16 is a graph illustrating the relationship between a coercive force of the rapidly cooled ribbon fabricated in Example 6 and a measurement temperature.

FIG. 16 shows the relationship between a coercive force and a measurement temperature for various samples. For comparison, the figure also shows properties of (3) Dy-added sintered magnet $Nd_{11.5}Dy_2Fe_{80}B_{6.5}$ and (4) Dy-free sintered magnet $Nd_{13.5}Fe_{80}B_{6.5}$.

The coercive force at room temperature of the Dy-added sintered magnet (3) is higher than that of the nano-polycrystalline magnets (1) and (2) of the examples, but at a high temperature of 160° C., the relationship is inverted, and the nano-polycrystalline magnets (1) and (2) show a higher coercive force. This is because the reduction ratio of coercive force with respect to temperature of the nano-polycrystalline magnets (1) and (2) is 0.35%/° C. and 0.39%/° C. respectively, and lower than that of Comparative Example (3) (0.48%/° C.).

Further, where the nano-polycrystalline magnets (1) and (2) are compared to each other, the coercive force of the nano-polycrystalline magnet (1) is higher and the reduction ratio of the coercive force is lower than those of the nano-polycrystalline magnet (2). This is apparently because the volume fraction of the grain boundary phase of the nano-polycrystalline magnet (1) increased over than of the nano-polycrystalline magnet (2) and, therefore, isolation between $Nd_2Fe_{14}B$ phases of the main phase increased.

Figure 17A:
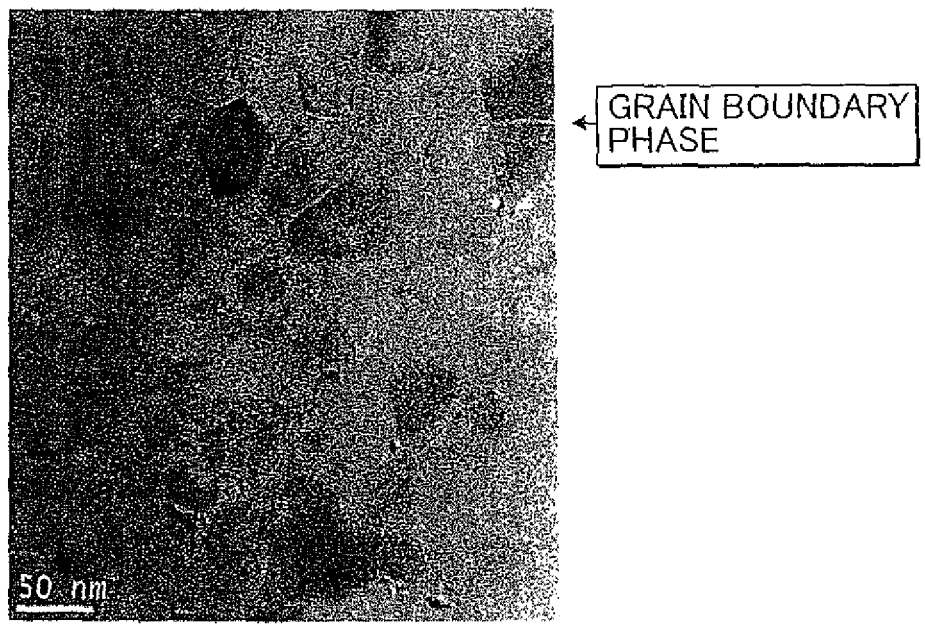
FIGS. 17A and 17B are photos showing Transmission Electron Microscope (TEM) images of the rapidly cooled ribbon fabricated in Example 6.
Figure 17B:
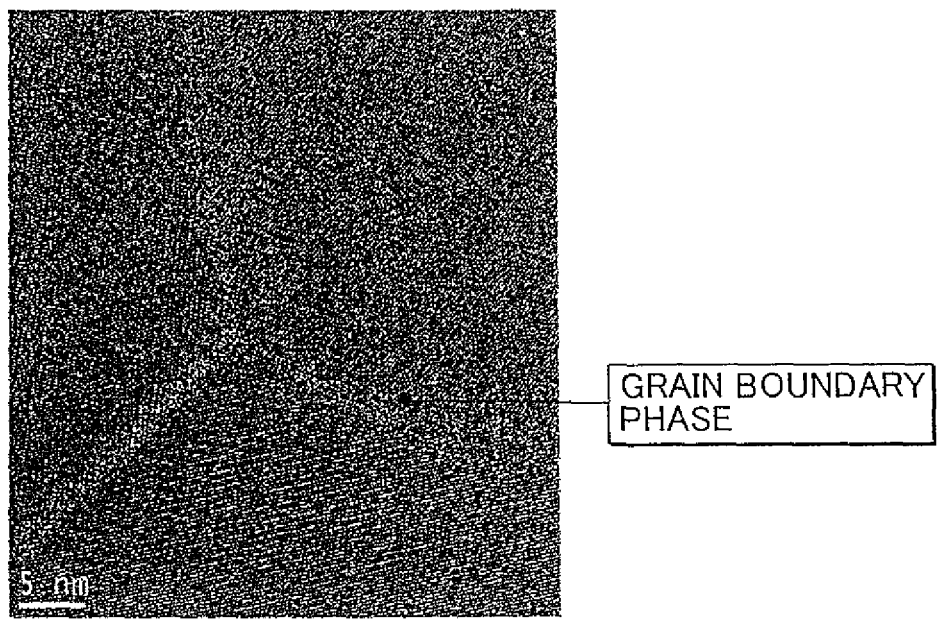

A grain boundary phase can be observed with a TEM, typically as shown in FIGS. 17A and 17B.

<When Additional Elements are Present>

Figure 18:
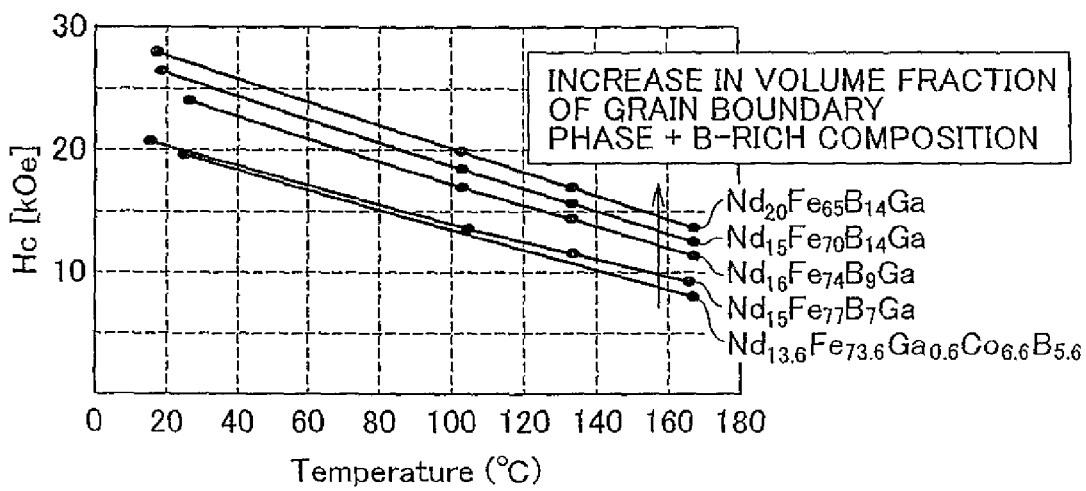
FIG. 18 is a graph illustrating the relationship between a coercive force of another rapidly cooled ribbon fabricated in Example 6 and a measurement temperature.
Figure 19:
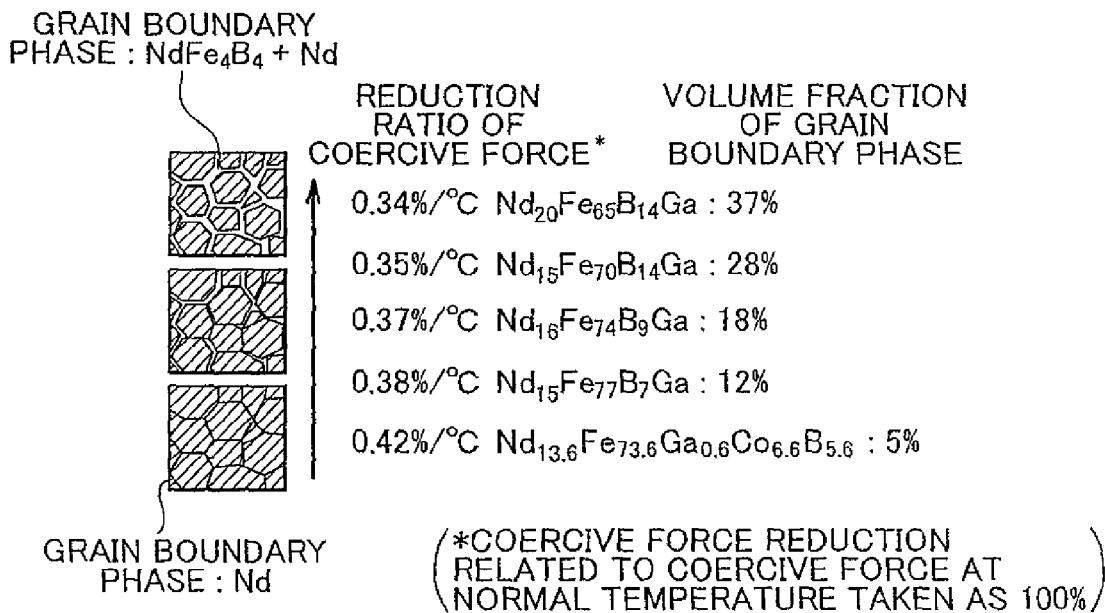
FIG. 19 is a schematic diagram illustrating the relationship between variations in a grain boundary phase of the rapidly cooled ribbon fabricated in Example 6 and a coercive force decrease rate with temperature.

FIGS. 18 and 19 show variations in the coercive force caused by a volume fraction of the grain boundary phase and increase in a B content in the case in which Ga was added.

As the volume fraction of the grain boundary phase increased and the ratio of the $NdFe_4B_4$ phase in the grain boundary phase also increased, grain refinement of the main phase and isolation between the main phases increased, the coercive force increased, and the reduction ratio of coercive force caused by temperature simultaneously decreased.

The invention provides a rare earth magnet in which formation of nanosize crystal grains is enhanced and a coercive force is increased due to the presence of a grain boundary phase and also a manufacturing method for such a magnet.

The invention claimed is:
1. A rare earth magnet comprising:
a composition represented by the compositional formula $R_aH_bFe_cCo_dB_eM_f$, where:
a, b, c, d, e and f are atomic percentages;
R is at least one rare earth element including Y;
H is at least one heavy rare earth element from among Dy and Tb;
M is at least one element from among Ga, Zn, Si, Al, Nb, Zr, Ni, Cu, Cr, Hf, Mo, P, C, Mg, and V;
13≤a≤20;
0≤b≤4;
c=100−a−b−d−e−f;
0≤d≤30;
4≤e≤20;
0≤f≤3, and including a structure constituted by a main phase: a $(RH)_2(FeCo)_{14}B$ phase, and a grain boundary phase: a $(RH)(FeCo)_4B_4$ phase and a RH phase, with a crystal grain size of the main phase of 10 nm to 200 nm, wherein
when a volume of the grain boundary phase to the earth magnet is within a range of from greater than 0% to less than 15%, a ratio of a volume the $(RH)(FeCo)_4B_4$ phase to a volume of the grain boundary phase is within a range of from greater than 0% to less than 50%,
when the volume fraction of the grain boundary phase to the rare earth magnet is 15% to 23%, the ratio of the volume of the $(RH)(FeCo)_4B_4$ phase to the volume of the grain boundary phase is 15% to 80%, and
when the volume fraction of the grain boundary phase to the rare earth magnet is more than 23%, the ratio of the volume of the $(RH)(FeCo)_4B_4$ phase to the volume of the grain boundary phase is 30% to 80%.
2. The rare earth magnet according to claim 1, wherein R is Nd, and
b=d=f=0, and the rare earth magnet includes a composition represented by the compositional formula $Nd_aFe_cB_e$ where:
13<a<20;
4<e<20;
c=100−a−e, and includes a structure constituted by
the main phase: a $Nd_2Fe_{14}B$ phase, and
the grain boundary phase: a $NdFe_4B_4$ phase and a Nd phase.
3. The rare earth magnet according to claim 1, comprising a composition represented by the compositional formula $Nd_aFe_cB_e$, where: 13≤a≤20; 4≤e≤20; c=100−a−e, and including a structure constituted by a main phase: a $Nd_2Fe_{14}B$ phase, and a grain boundary phase: a $NdFe_4B_4$ phase and a Nd phase.
4. The rare earth magnet according to claim 3, wherein a volume ratio of the $NdFe_4B_4$ phase and the Nd phase is ($NdFe_4B_4$ phase):(Nd phase)=20:80 to 80:20.
5. The rare earth magnet according to claim 1, wherein the crystal grain size of the main phase is 10 nm to 50 nm.
6. A method for manufacturing a rare earth magnet, comprising:
rapidly cooling and solidifying an alloy melt including a composition represented by the compositional formula $R_aH_bFe_cCo_dB_eM_f$, where:
a, b, c, d, e and f are atomic percentages;
R is at least one rare earth element including Y;
H is at least one heavy rare earth element from among Dy and Tb;
M is at least one element from among Ga, Zn, Si, Al, Nb, Zr, Ni, Cu, Cr, Hf, Mo, P, C, Mg, and V;
13≤a≤20;
0≤b≤4;
c=100−a−b−d−e−f;
0≤d≤30;

$4 \leq e \leq 20$;

$0 \leq f \leq 3$, thereby creating a structure constituted by a main phase: a $(RH)_2(FeCo)_{14}B$ phase, and a grain boundary phase: a $(RH)(FeCo)_4B_4$ phase and a RH phase, with a crystal grain size of the main phase of 10 nm to 200 nm, wherein when a volume fraction of the grain boundary phase to the rare earth magnet is within a range of from greater than 0% to less than 15%, a ratio of a volume the $(RH)(FeCo)_4B_4$ phase to a volume of the grain boundary phase is within a range of from greater than 0% to less than 50%, when the volume fraction of the grain boundary phase to the rare earth magnet is 15% to 23%, the ratio of the volume the $(RH)(FeCo)_4B_4$ phase to the volume of the grain boundary phase is 15% to 80%, and when the volume fraction of the grain boundary phase to the rare earth magnet is more than 23%, the ratio of the volume the $(RH)(FeCo)_4B_4$ phase to the volume of the grain boundary phase is 30% to 80%.

7. The manufacturing method according to claim 6, wherein
the rapid cooling and solidification is performed at a cooling rate of $5 \times 10^5$ K/s to $2 \times 10^6$ K/s.

8. The manufacturing method according to claim 6, wherein
the structure is created by crystallization induced by annealing after an amorphous state is created by the rapid cooling and solidification.

* * * * *